United States Patent [19]

Richards et al.

[11] Patent Number: 5,143,751
[45] Date of Patent: Sep. 1, 1992

[54] METHOD OF MAKING HIGHLY SINTERABLE LANTHANUM CHROMITE POWDER

[75] Inventors: Von L. Richards; Subhash C. Singhal, both of Murrysville, Pa.

[73] Assignee: Westinghouse Electric Corp., Pittsburgh, Pa.

[21] Appl. No.: 495,884

[22] Filed: Mar. 19, 1990

[51] Int. Cl.⁵ .......................... B05D 5/12; B05D 3/02
[52] U.S. Cl. ................................. 427/126.3; 264/42; 264/60; 427/215; 427/376.2
[58] Field of Search ........................... 264/42, 43, 60; 427/126.3, 212, 215, 376.1, 376.2

[56] References Cited

U.S. PATENT DOCUMENTS

| | | | |
|---|---|---|---|
| 4,490,444 | 12/1984 | Isenberg | 429/31 |
| 4,609,562 | 9/1986 | Isenberg et al. | 427/8 |
| 4,631,238 | 12/1986 | Ruka | 429/30 |
| 4,861,345 | 8/1989 | Bowker et al. | 29/623.1 |

OTHER PUBLICATIONS

Anderson, "Fabrication And Property Control of LaCrO₃ Based Oxides," *Materials Science Research*, vol. II, Plenum Press, (1977), pp. 469–477.

Groupp et al., *J. Amer. Ceram. Soc.*, vol. 59, No. 9-10, (1976), pp. 449–450.

Meadowcroft et al., *Ceram. Bull.*, vol. 58, No. 6, (1979), pp. 610–615.

Eror and Anderson, *Mat. Res. Soc. Symp. Proc.*, vol. 73, (1986), pp. 571–577.

Chick et al., *Proc. 1st Intl. Symp. On Solid Oxide Fuel Cells*, vol. 89-11, (1989), pp. 170–186.

*Primary Examiner*—James Lowe
*Assistant Examiner*—Christopher A. Fiorilla
*Attorney, Agent, or Firm*—Daniel P. Cillo

[57] ABSTRACT

A highly sinterable powder consisting essentially of $LaCrO_3$, containing from 5 weight % to 20 weight % of a chromite of dopant Ca, Sr, Co, Ba, or Mg and a coating of a chromate of dopant Ca, Sr, Co, Ba, or Mg; is made by (1) forming a solution of La, Cr, and dopant; (2) heating their solutions; (3) forming a combined solution having a desired ratio of La, Cr, and dopant and heating to reduce solvent; (4) forming a foamed mass under vacuum; (5) burning off organic components and forming a charred material; (6) grinding the charred material; (7) heating the char at from 590° C. to 950 C. in inert gas containing up to 50,000 ppm $O_2$ to provide high specific surface area particles; (8) adding that material to a mixture of a nitrate of Cr and dopant to form a slurry; (9) grinding the particles in the slurry; (10) freeze or spray drying the slurry to provide a coating of nitrates on the particles; and (11) heating the coated particles to convert the nitrate coating to a chromate coating and provide a highly sinterable material having a high specific surface area of over 7 $m^2/g$.

13 Claims, 2 Drawing Sheets

METHOD OF MAKING HIGHLY SINTERABLE LANTHANUM CHROMITE POWDER

GOVERNMENT CONTRACT

The Government of the United States of America has rights in this invention pursuant to Contract No. DE-AC-0280-ET-17089, awarded by the U.S. Department of Energy.

BACKGROUND OF THE INVENTION

The present invention relates to a method of making highly sinterable lanthanum chromite powder, which can be used in making a connection layer on an electrode of an electrochemical cell.

High temperature electrochemical cells are taught in U.S. Pat. No. 4,490,444 (Isenberg). In these types of cells, typified by fuel cells, a porous support tube of calcia stabilized zirconia, has an air electrode cathode deposited on it. The air electrode may be made of, for example, doped oxides of the perovskite family, such as lanthanum manganite. Surrounding the major portion of the outer periphery of the air electrode is a layer of gas-tight solid electrolyte, usually yttria stabilized zirconia. A selected radial segment of the air electrode is covered by an interconnection material. The interconnection material may be made of a doped lanthanum chromite film. The generally used dopant is Mg, although Ca and Sr have also been suggested.

Both the electrolyte and interconnect material are applied on top of the air electrode by a modified electrochemical vapor deposition process; at temperatures of up to 1,450° C., with the suggested use of vaporized halides of zirconium and yttrium for the electrolyte, and vaporized halides of lanthanum, chromium, magnesium, calcium or strontium for the interconnection material, as taught in U.S. Pat. No. 4,609,562 (Isenberg et al.).

U.S. Pat. No. 4,631,238 (Ruka), in an attempt to solve potential interconnection thermal expansion mismatch problems between the interconnect, electrolyte, electrode, and support materials, taught cobalt doped lanthanum chromite, preferably also doped with magnesium, for example $La_{.97}Mg_{.03}Co_{.04}Cr_{.96}O_3$, as a vapor deposited interconnection material, using chloride vapors of lanthanum, chromium, magnesium, and cobalt.

It has been found, however, that there are certain thermodynamic and kinetic limitations in doping the interconnection from a vapor phase by an electrochemical vapor deposition process at 1,300° C. to 1,450° C. The vapor pressures of the calcium chloride, strontium chloride, cobalt chloride, and barium chloride are low at vapor deposition temperatures, and so, are not easily transported to the reaction zone at the surface of the air electrode.

Thus, magnesium is the primary dopant used for the interconnection material. However, magnesium doped lanthanum chromite, for example $La_{.97}Mg_{.03}CrO_3$, has a 12% to 14% thermal expansion mismatch with the air electrode and electrolyte material. Additionally, formation of an interconnection coating solely by electrochemical vapor deposition can lead to interconnection thickness variations along the cell length. Then, thin portions would be subject to possible leakage, and thick portions would be subject to increased thermal expansion stresses. Finally, electrochemical vapor deposition of these materials as thin, dense, leak-proof films is an expensive and complicated procedure.

U.S. Pat. No. 4,861,345 (Bowker et al.), in a completely different approach, taught depositing particles of $LaCrO_3$, doped with Sr, Mg, Ca, Ba or Co and coated with calcium oxide or chromium oxide, on an air electrode, and then sintering in air at 1,400° C. Here, the metal of the surface deposit was absorbed into the $LaCrO_3$ structure. This process completely eliminated vapor deposition steps and the skeletal support structure.

However, lanthanum chromite compounds are known to be difficult to sinter in air without the application of pressure, as taught by Anderson, "Fabrication And Property Control of $LaCrO_3$ Based Oxides", in *Materials Science Research*, Vol. 11, Plenum Press (1977), pp. 469–477. Anderson concluded that sintering Cr-containing oxides to a high density required controlling the oxygen activity in the furnace by flowing $CO/CO_2$, $H_2/CO_2$, or $H_2/H_2O$ gas mixtures through the furnace during sintering, in order to control $Cr^{3+}$ ion volatilization. Some substitution of Al for Cr was also suggested.

Group et al., *J. Amer. Ceram. Soc.*, Vol. 59, No. 9-10, (1976), pp. 449–450, had also recognized the difficulty in sintering $LaCrO_3$ by normal techniques, primarily due to volatilization of Cr oxide compounds in oxidizing atmospheres. They prepared compositions containing up to 20 mole % Sr by dissolving nitrates of the constituent La, Sr, and Cr cations in a solution of citric acid and ethylene glycol, followed by evaporation at 135° C., to provide a glass-like resin, which was then calcined at 800° C., to provide a $La_{1-x}Sr_xCrO_3$ material. Powder samples of this material, with distilled water as binder, were uniaxially pressed, at 2,115 kg./cm.$^2$ (20.685 MPa), to provide discs of 55% to 60% theoretical density, which were then sintered in the temperature range of from 1,600° C. to 1,700° C. for 1 hour, at oxygen activities of from $10^{-12}$ to $10^{-11}$ atm., to provide compacts having maximum densities of 95%+.

Meadowcroft et al., *Ceram. Bull.*, Vol. 58, No. 6, (1979), pp. 610–615, also recognized oxidation and vaporization problems with Sr or Ca doped $LaCrO_3$ in air at over 1,600° C. They mixed $La_2O_3$ and $Cr_2O_3$ with $SrCO_3$, in appropriate amounts, and prefired the mixture in air at 1,400° C. The reacted powder was first uniaxially, and then isostatically pressed, and fired at 1,500° C. in air. The influence of substitutions on vaporization rate was studied for:

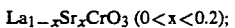

$La_{1-x}Sr_xCrO_3$ (0<x<0.2);

$La_{0.08}Sr_{0.2}Al_{0.5}Cr_{0.5}O_3$;

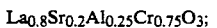

$La_{0.8}Sr_{0.2}Al_{0.25}Cr_{0.75}O_3$;

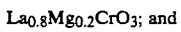

$La_{0.8}Mg_{0.2}CrO_3$; and

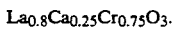

$La_{0.8}Ca_{0.25}Cr_{0.75}O_3$.

The lowest vaporization rate was achieved for the calcium aluminum containing material.

Eror and Anderson, in "Polymeric Precursor Synthesis of Ceramic Materials", *Mat. Res. Soc. Symp. Proc.*, Vol. 73, (1986), pp. 571–577, taught mixing the raw materials needed to make chromites, such as $Cr_2O_3$, $LaCrO_3$, $MgCr_2O_4$, and the like, with anhydrous citric acid and ethylene glycol; heating the mixture to form a solution; evaporating the solution until an amorphous organic polymer formed; charring the solid at 400° C. to provide a brittle mass; grinding and screening; and then calcining in air at 700° C. to 800° C., to provide a homogeneous single phase of precise cationic stoichiometry and particle size.

In the teachings of Eror and Anderson, there was no precipitation in the solution as it was evaporated to form a rigid polymeric state in the form of a glass, and all reactions were apparently conducted in air. Upon analysis, the final material appears to have low specific surface areas, in the order of 0.5 $m^2/g$ to 4 $m^2/g$, which could provide difficulty in getting small particles. The authors note a disadvantage of their process is that powder agglomerates are hard, so that a dispersion of monosized particles might be difficult, and the process can take from 1 day to 3 days to complete. The grinding step in particular takes a long time, due to the hardness of the brittle char.

Another process for making lanthanum chromite powder for solid oxide fuel cell interconnections has been described by Chick et al., in "Synthesis Of Air-Sinterable Lanthanum Chromite Powders", *Proceedings Of The First International Symposium On Solid Oxide Fuel Cells*, Vol. 89-11, (1989), pp. 170–186. They recognized that sintering lanthanum chromites in air, even at temperatures above 1,700° C. resulted in low densities and substantial open porosity. They also recognized that the powder should consist of dense, spherical, submicron sized particles in discrete rather than agglomerated form. They made such particles using a glycine/nitrate powder synthesis technique, where metal nitrates and glycerine were dissolved in water, and then the solution was boiled until it thickened and ignited, producing ash that contained the oxide product. While agglomerates were produced, they were soft, not hard, and could be broken down into discrete monosized particles with minimal effort. They also found that when the composition of glycine/nitrate-produced Sr-substituted lanthanum chromite powder was adjusted so that the calcined material contained 3 mole % to 5 mole % $SrCrO_4$, densification in air was enhanced, probably due to the presence of a liquid phase at the sintering temperature. This process involved spontaneous ignition. Its use on a large commercial scale may involve expensive or complicated safety precautions or equipment.

None of the proposed solutions solve all the problems of thermal expansion mismatch, and, problems associated with doping calcium, strontium, cobalt, and barium into interconnections without electrochemical vapor deposition, or of providing a uniform, leak proof interconnection thickness in a simple, fast, economical, and 100% safe fashion. It is an object of this invention to solve such problems.

SUMMARY OF THE INVENTION

Accordingly, the present invention resides in a method of making a highly sinterable lanthanum chromite powder containing a dopant metal, characterized by the steps: (1) separately dissolving a La source, a Cr source and a source of a dopant metal selected from the group consisting of Ca, Sr, Co, Ba, Mg, and mixtures thereof, in a mixture of an acid selected from the group consisting of polycarboxylic acids, hydroxy acids, and mixtures thereof, and a polyhydroxy alcohol, to form a solution of each: (2) evaporating a substantial amount of the solution; (3) mixing the solutions together in the desired proportions to achieve a desired ratio of La, Cr and dopant metal, and further heating the solution mixture to reduce alcohol content and to form submicron polymer precipitates; (4) heating the solution mixture under a vacuum condition until a foamed, porous mass of amorphous organic polymeric material forms; (5) heating the foamed amorphous polymeric material to burn off organic components and produce a hard, charred material comprising La, Cr, and dopant metal; (6) grinding the charred material to a powder; (7) heating the charred, ground powder at from 590° C. to 950° C., in a flowing atmosphere of inert gas containing from 100 ppm to 50,000 ppm $O_2$, for a time effective to provide a sinterable material having a high specific surface area of over 7 $m^2/g$, consisting essentially of $LaCrO_3$, containing from 5 weight % to 20 weight % of a chromite of the dopant metal; (8) adding the high specific surface area sinterable material solids to an aqueous solution mixture of a nitrate of Cr and a nitrate of a dopant metal selected from the group consisting of Ca, Sr, Co, Ba, Mg, and mixtures thereof, to form a slurry, where the total nitrate is added in an amount effective to provide from 3 weight % to 20 weight % dopant metal chromate upon subsequent evaporation and heating in step (11); (9) grinding the particles in the slurry to provide particles of a sinterable material having a desired diameter in the slurry; (10) taking the nitrate slurry with the ground particles and simultaneously evaporating solvent and coating the particles of sinterable material with a solidified mixture of nitrates, to provide dry, coated particles; and (11) heating the dry, coated particles at a temperature effective to convert the nitrate coating to a chromate coating, where the chromate coating constitutes from 3 weight % to 20 weight % of the total weight of the coated particles, to provide a highly sinterable material having a high specific surface area of over 7 $m^2/g$.

Most preferably, the invention will also include, after step (3), adding from 1 weight % to 10 weight % of combustible organic particles to the solution mixture, as a fugitive pore forming additive. The preferred additive is chopped wood fibers having lengths up to approximately 1 micrometer. Preferably, the invention will also include diluting the solutions after step (2) with a liquid selected from the group consisting of $H_2O$, polyhydroxy alcohol, and mixtures thereof, to lower the viscosity of the solution; and filtering off any precipitate during step (2). Preferably, in the step (7) heating, the flowing atmosphere will contain below 300 ppm $CO_2$. Preferably, after step (8) slurry formation, the pH of the slurry will be adjusted to between 3.5 and 5.5, if it is not already in that range. The preferred means of simultaneous evaporation and coating of step (10) will be via spray-drying or freeze-drying techniques.

This method controls the porosity, hardness and chromium content of the final, highly sinterable material. This method also utilizes a low oxygen content, inert gas environment in step (7), bypassing initial chromate formation reactions, and forming powders of high specific surface area with controlled agglomerate size and coated with a low melting chromate of the dopant metal. The use of heating under a vacuum in step (4), and optional, but preferred use of a pore forming additive, reduces the usually, very long grinding time by 50% to 80% and aids in the formation of a smaller final particle size. Preferably, in steps (2) and (3), from 20 weight % to 60 weight % of the solution is evaporated, first by heating at from 100° C. to 120° C. to evaporate up to 20 weight %, and then heating in a rotating evaporator until esterification and polymerization proceeds to a color change point and microscopic precipitates begin to form.

The invention further resides in a highly sinterable powder, characterized in that the powder comprises particles having a high specific surface area of over 7 m$^2$/g, the particles consisting essentially of LaCrO$_3$, containing from 5 weight % to 20 weight % of a chromite of a dopant metal selected from the group consisting of Ca, Sr, Co, Ba, Mg, and mixtures thereof, and coated with a chromate of a dopant metal selected from the group consisting of Ca, Sr, Co, Ba, Mg, and mixtures thereof, where the chromate coating constitutes from 3 weight % to 20 weight % of the total weight of the coated particles.

The preferred dopant metal for LaCrO$_3$ and the coating is Sr, the preferred range of dopant metal chromate, for example SrCrO$_4$, is from 8 weight % to 12 weight %, and the powder most preferably has a particle size from 0.01 micrometer to 3 micrometers. The smaller the particle size and the larger the specific surface area, the greater ease in sintering, to provide a dense, leak proof film. The particles described herein are a loose, fine agglomerate which can be easily broken up to provide very small discrete particles.

This powder can be deposited directly on a portion of an air electrode of an electrochemical cell, such as a fuel cell, preferably as a very thin film, and sintered, to provide an inexpensive and dramatically improved interconnection layer, without further processing. This powder can also be pressed into pellets, as for example by simple cold pressing, and then sintered, to provide high density pellets. These pellets could then be crushed, washed, and sieved to provide particles having diameters in the range of from 30 micrometers to 80 micrometers, which could be used in conjunction with wellknown electrochemical vapor deposition techniques, to provide an interconnection layer. Additional steps, including applying a solid electrolyte layer over the remaining portion of the air cathode, and applying a cermet fuel electrode anode over the electrolyte, will complete formation of an electrochemical cell.

The method of this invention allows easy Ca, Sr, Co, Ba or Mg doping of the interconnection, lowering of the thermal expansion mismatch with the air electrode and electrolyte, and allows a uniform, leak free deposit of interconnect material, while eliminating the expense and complexity of electrochemical vapor deposition processes.

BRIEF DESCRIPTION OF THE DRAWINGS

In order that the invention can be more clearly understood, conventional embodiments thereof will now be described, by way of example, with reference to the accompanying drawings, in which.

DESCRIPTION OF THE PREFERRED EMBODIMENTS

Figure 1:
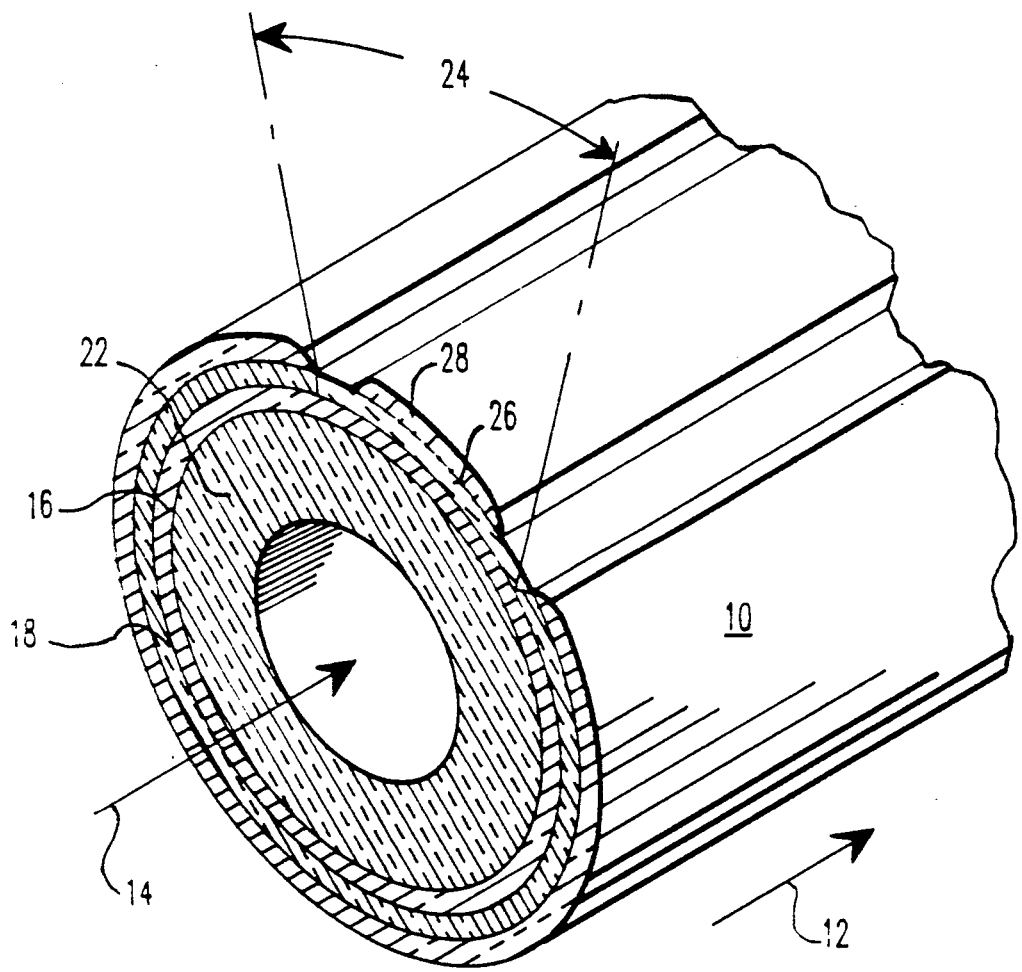
FIG. 1 is a schematic sectional view of a preferred embodiment of a single, tubular electrochemical cell, showing the interconnection layer formed from the particles of this invention on top of a supporting electrode.

Referring now to FIG. 1 of the Drawings, a preferred, tubular, electrochemical cell 10 is shown. The preferred configuration is based upon a fuel cell system, wherein a flowing gaseous fuel, such as hydrogen or carbon monoxide, is directed axially over the outside of the cell, as indicated by the arrow 12, and an oxidant, such as air, or O$_2$ indicated by the arrow 14, flows through the inside of the cell. Where the cell is as shown, oxygen molecules pass through porous, electronically conductive air electrode structure 16 and are changed to oxygen ions which pass through the electrolyte 18, to combine with fuel at the exterior fuel electrode.

It should be noted that the following description of the preferred tubular configuration should not be considered limiting. It should also be noted that the powder of this invention, described hereinafter, could be applied for any function to electrochemical cells other than fuel cells. The term "air electrode" as used throughout means that electrode which will be in contact with oxidant, and "fuel electrode" means that electrode that will be in contact with fuel.

The cell 10 can include an optional, porous support tube 22. The support tube can be comprised of calcia stabilized zirconia, forming a porous wall approximately one to two millimeters thick. The air electrode, or cathode 16 is a porous, composite metal oxide structure approximately 50 micrometers to 1,500 micrometers (0.05 millimeter to 1.5 millimeter) thick. It can be deposited on the support tube by slurry dip and sinter techniques, or extruded as a self-supporting structure. The air cathode is, for example, comprised of doped oxides or mixtures of oxides of the perovskite family, such as LaMnO$_3$, CaMnO$_3$, LaNiO$_3$, LaCoO$_3$, LaCrO$_3$, and the like. Preferred dopants are strontium, calcium, cobalt, nickel, iron, and tin.

Surrounding most of the outer periphery of the air electrode 16 is a layer of gas-tight solid electrolyte 18, generally comprised of yttria stabilized zirconia about 1 micrometer to about 100 micrometers thick (0.001 millimeter to 0.1 millimeter). The electrolyte 18 can be deposited onto the air electrode by well known, high temperature, electrochemical vapor deposition techniques. In the case where electrolyte is to be deposited before the interconnection, a selected radial segment or portion 24 of the air electrode 16 is masked during electrolyte material 26 is deposited on this segment or portion 24. If the interconnection is to be deposited first then the electrolyte portion of the air electrode is masked initially.

The dense interconnection material 26, which preferably extends the active axial length of each elongated cell 10 as shown, must be electrically conductive in both an oxidant and fuel environment. The gas-tight interconnection 26 is roughly similar in thickness to the electrolyte, about 30 micrometers to about 100 micrometers (0.03 millimeter to 0.1 millimeter). The interconnection should be non-porous (over about 95% dense) and preferably be nearly 99% to 100% electronically conductive at 1,000° C., the usual operating temperature of a fuel cell.

The interconnection must be dense and leak-proof and also have a coefficient of thermal expansion close to that of the solid electrolyte, and the electrode onto which it is deposited, and the other components, including the support tube, if used. The usual interconnection material is doped lanthanum chromite, of approximately 20 micrometers to 50 micrometers (0.02 millimeter to 0.05 millimeter) thickness. Usually, an electrically conductive layer 28 is deposited over the interconnection 26. This layer 28 is preferably comprised of the same material as the fuel anode 20, nickel or cobalt zirconia cermet, and about the same thickness, 100 micrometers.

Undoped lanthanum chromite is not very useful as an electronic interconnection, due to its combination of marginal conductivity, and mismatch of thermal expansion coefficient with the rest of the fuel cell components. In the interconnection powder of this invention at least one of Ca, Sr, Co, Ba, and Mg can be included as a dopant.

Figure 2:
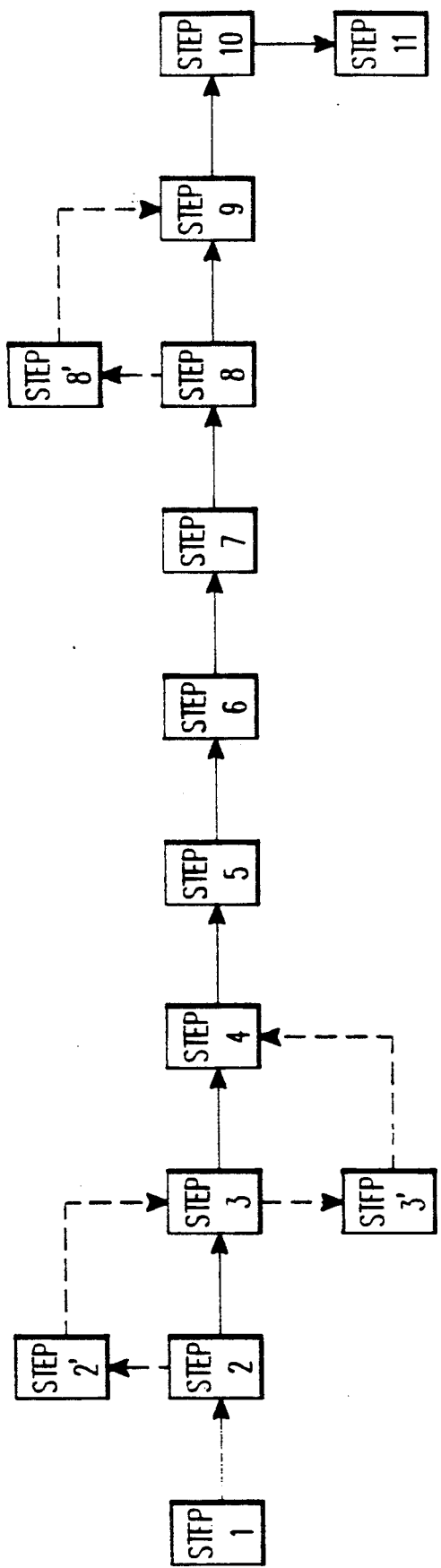
FIG. 2, which best shows the invention, is a block diagram of the method of this invention.

Referring now to FIG. 2, a block diagram of the method of this invention is shown. In step 1, a La source, a Cr source and a dopant metal source are separately dissolved in an acid selected from polycarboxylic acids, hydroxy acids, or their mixtures, and a polyhydroxy alcohol, to form a solution of each. The dopant metal can be selected from the group consisting of Ca, Sr, Co, Ba, Mg and their mixtures. The source can be selected from the group consisting of carbonates, hydroxides, isopropoxides, nitrates or the like, and their mixtures, with nitrates preferred. Thus, for example, appropriate amounts of $La(NO_3)_2$, $CrNO_3$, and $Sr(NO_3)_2$, to provide a final product of the formula $La_{0.83}Sr_{0.16}CrO_3$, i.e., $(LaCrO_3)_{0.83} \cdot (SrCrO_3)_{0.16}$ are each mixed with polycarboxylic acids to form polybasic acid chelates which undergo esterification when heated in a polyhydroxy alcohol.

Particularly useful acids include weak acids selected from the group consisting of polycarboxylic acids: for example, malonic acid, maleic acid, phthalic acid, and the like; and hydroxy acids: for example, lactic acid, citric acid, and the like, and their mixtures. Preferably, from 2.5 equivalents to 3.5 equivalents of acid is used per 1.0 equivalent of metal. Particularly useful polyhydroxy alcohols can include, for example, neopentyl glycol, ethylene glycol, propylene glycol, butane diol, and the like. Usually, each metal source is mixed with the acid and alcohol and heated at from 80° C. to 125° C., until all of the metal cations go into solution.

In step 2, the solutions, which are usually clear, are further heated, preferably from 100° C. to 120° C., to evaporate a substantial amount of the source anion; for example, nitrate, from each solution. The liquid of each can be analyzed for actual cation content. Optionally, in step 2', the solution can be diluted with $H_2O$ polyhydroxy alcohol or their mixtures, to lower the viscosity of the concentrated solution. Also, in step 2', any precipitate formed during concentration, such as in hydroxide or carbonate, can be removed by filtration.

In step 3, the solutions are mixed together in the desired proportions to achieve a desired cation ratio of La, Cr and dopant metal, to provide, for example, a final powder having particles of the composition $La_{0.83}Sr_{0.16}CrO_3$, and then the mixture is further heated to reduce alcohol solvent content, preferably at from 100° C. to 140° C. Approximately, 20 weight % to 60 weight % of the solution mixture is evaporated. Most preferably, in step 3, the mixture is initially heated in a container until 20 weight % to 25 weight % of the solution is evaporated, and then in step 4, the partly evaporated solution mixture is transferred to a rotating evaporation means, such as a vacuum rotoevaporator, and held at 140° C. in approximately a 20 inch Hg vacuum until esterification and polymerization proceeds to the point of a liquid color change (usually), and submicron polymer precipitates are visible on a glass slide.

In optional, but much preferred, step 3', organic particles are added. From 1 weight % to 10 weight % preferably from 1 weight % to 5 weight %, based on solution mixture weight plus particle weight, of combustible organic particles, preferably fibers, are stirred into the solution. The particles can have diameters or lengths up to approximately 1 micrometer. Over 1 micrometer size or over 10 weight % and burning of this pore forming, fugitive filler additive will be difficult. Chopped wood; ashless, high grade, cellulosic filter paper pulp; cotton; or low melting plastic that decompose cleanly are some examples of useful additives. Inclusion of this additive can dramatically reduce the time required for subsequent grinding steps and improve the fineness of the final product particle size.

In step 4, the solution mixture, now stripped of most anion source material and already partially evaporated of solvent, is further heated in an oven under a vacuum condition, at from approximately 30 cm to 65 cm Hg, to form a surface skin, after which the vacuum is increased and porous, foamed cakes of amorphous polymeric material are formed at approximately 150° C. Providing a foamed amorphous product helps dramatically, along with the use of fibers in step 3', to reduce the time required for subsequent grinding steps.

In step 5, the foamed cakes are preferably crushed to a particle size smaller than approximately 7 mm diameter and heated to char the amorphous mass. Preferably, this heating step will be carried out in air at temperatures from 250° C. to 325° C., most preferably from Heating over 325° C. in air can cause excessive decomposition resulting in free $Cr_2O_3$ and very large particle sizes (low specific surface area) in the product of step 7 below. The air supply can be restricted to keep the temperature within this range. This charring step will burn off a portion of the organic components, including any added fugitive filler and produce a charred, brittle, friable, glassy material comprising La, Cr, and dopant metal. Weight loss during this step is preferably between 50% to 65%. The char will be somewhat foamed and porous and contain a series of internal voids and interconnecting passages.

In step 6, the charred material is ground with a non-contaminating media, for example dry milled with zirconia media in a polyethylene container. This milling step can take over 16 hours to get 20% of the material below 150 micrometers diameter if material is not foamed in step 4 and if the fugitive filler is not used; whereas over 80% of the material can be milled to below 150 micrometers in less than 16 hours if appropriate amounts of fugitive filler are included and the material is foamed in step 4. Metal grinding media should not be used because substantial amounts of metal would be incorporated into the final atomic structure of the interconnection powder. Any suitable, non-contaminating grinding means to reduce particle size to between 10 micrometers to 200 micrometers, preferably between 10 micrometers and 125 micrometers would be appropriate in this step. Particle sizes over 200 micrometers diameter tend to produce larger than desired particle sizes after subsequent calcining.

In step 7, the charred, ground powder is calcined, at from 590° C. to 950° C., preferably from 650° C. to 850° C. Calcining below 590° C. will leave residual organic material which cannot be easily removed during subsequent sintering, and also leave $LaCrO_4$ (chromate) providing an undesirable multiphase powder. Calcining over 950° C., will cause the surface area to drop below a readily sinterable range.

Instead of calcining in air in step 7, the charred, ground powder is calcined in a flowing atmosphere of inert gas, such as Ar or $N_2$ gas, containing from 100 ppm to 50,000 ppm (5%), preferably, from 5,000 ppm to 30,000 ppm (3%) $O_2$, and preferably below 300 ppm $CO_2$, most preferably below 10 ppm $CO_2$, or no $CO_2$ at all. Over 300 ppm $CO_2$, any chromate or carbonate intermediate which occur may not decompose and go into substitution in the $LaCrO_3$ as readily. Thus, longer calcining times and higher temperatures may be required, resulting in coarser (low specific surface area) powder which would be less sinterable. The calcining is continued for a time effective to provide a highly sinterable material having a high specific surface area of from over 7 $m^2/g$, preferably from 7 $m^2/g$ to 30 $m^2/g$, and preferably from approximately 0.01 micrometer to 50 micrometers. Specific surface areas under 7 $m^2/g$ will not provide void free, high density, highly sinterable interconnection coatings Specific surface areas over 30 $m^2/g$, will tend to increase difficulty in subsequent slurry casting or pressing. Particle sizes over 50 micrometers will tend to increase difficulty in subsequent slurry grinding steps.

The sinterable material after step 7 will consist essentially of $LaCrO_3$ containing from 5 weight % to 20 weight % of a chromite of the dopant metal, for example, a material having the approximate composition $La_{0.83}Sr_{0.16}CrO_3$, which is equivalent to:

$$(LaCrO_3)_{0.83} \cdot (SrCrO_3)_{0.16}$$

where the minor amount of $SrCrO_3$ is in solid solution with the major amount of $LaCrO_3$. In this example, the weight % of dopant chromite, i.e., $SrCrO_3$ in the total composition is:

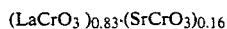

$$0.83(130(0.99) + (52+48)] = 13 \text{ weight } \%.$$

By utilizing a low oxygen content and inert gas environment, powders of high specific surface area are formed. Generally, the smaller the particle size and the larger the specific surface area, the greater the sinterability of the powder.

In the next several steps, a coating of chromate will be applied as a film, covering each of the doped lanthanum chromite particles, to act as a sintering aid. In step 8, the high specific surface area sinterable material solids are added to an aqueous solution mixture of a nitrate of Cr and a nitrate of a dopant metal selected from the group consisting of Ca, Sr, Co, Ba, Mg, and their mixtures. This provides a slurry. The slurry will be subsequently heated to evaporate solvent and convert the nitrate coating to a chromate coating.

The total nitrate added in step 8 will be an amount calculated from the sinterable material solids to provide from 3 weight % to 20 weight % dopant metal chromate upon subsequent evaporation and heating. Preferably, the aqueous solution mixture will also contain an alcohol or other wetting agent, in an amount effective to reduce the surface tension of the solution. The most preferred wetting agent is a 1:1 volume mixture of alcohol and water. In step 8', the pH of the slurry will be adjusted to between 3.5 and 5.5 if it is not already in that range. Nitric acid and the like can be used to lower the pH and tetraethylene ammonium hydroxide and the like can be used to raise the pH.

In step 9, the slurry is poured into a grinding means, such as a ball mill having a non-contaminating grinding medium, such as zirconia media in a polyethylene container, for up to 40 hours, to provide particles of the sinterable material in the slurry having the desired diameter, preferably up to 3 micrometers, and most preferably from 0.01 micrometer to 3 micrometers. Particles with sizes over 3 micrometers will tend to grow as grains at the expense of the fine high surface area powder without bulk densification and may cause voids in the final interconnection film.

In step 10, the nitrate slurry with the ground particles is treated to simultaneously evaporate solvent and coat the particles of sinterable materials in the slurry with a solidified mixture of nitrates, to provide dry, substantially coated particles. The process to simultaneously evaporate and coat, preferably will be a spray drying or freeze drying process, both well known in the art. In spray drying, the slurry is atomized and pressure injected into a stream of hot air. Inlet temperatures can be up to about 200° C. In freeze-drying, the slurry is pressure sprayed into a cold ($-70°$ C.) hexane bath. Water is removed from the solid spheres of particles and ice crystals by sublimation and form spherical shaped masses as a free flowing powder. Of the two processes, spray drying is preferred.

In step 11, the dry, coated particles are heated in an oven at a temperature effective to convert the nitrate coating to a chromate coating. The preferred temperature range is from 400° C. to 600° C. The chromate coating, for example $SrCrO_4$, will constitute from 3 weight to 20 weight %, preferably from 3 weight % to 10 weight of the total weight of the coated particles. Inclusion of a chromate coating is essential as a sintering aid for the $La_{0.83}Sr_{0.16}CrO_3$. $SrCrO_4$, for example, melts incongruently in air to form $Cr_2O_3$ plus liquid plus $O_2$ at about 1,250° C. The equilibrium phase constitution of $La_{1-x}Sr_xCrO_3$, up to $x=0.25$, remains a perovskite solid solution of temperatures up to 1,500° C. Inclusion of $SrCrO_4$ or other enumerated chromates will allow faster and more complete sintering of the powder at temperatures between 1,250° C. and 1,500° C. Use of over 10 weight % chromate sintering aid coating, if the powder is used as an interconnection layer on a fuel cell air electrode substrate, will tend to allow air electrode material leaching into the interconnection at high temperatures. Over 20 weight % chromate sintering aid coating, the powder will flow under its own weight so that slumping control would be lost.

The final, highly sinterable powder will constitute particles containing $LaCrO_3$ in major amount in solid solution with a minor amount of dopant metal chromite, the particles covered with a thin film of dopant metal chromate acting as a lower melting sintering aid, where the powder particles have specific surface areas of over 7 $m^2/g$, and the dopant metals are selected from at least one of Ca, Sr, Co, Ba, or Mg, preferably Sr. This powder will have a particle size, preferably of from 0.01 micrometer to 3 micrometers, and can be used directly to form a sintered interconnection. It can also be further processed and sintered, to provide larger particles that can be utilized in conjunction with electrochemical vapor deposition techniques, well known in the art, to provide interconnection layers. This further processing would include consolidating the sintered powder into pellets or the like, sintering the consolidated pellets, and then breaking them up and sieving to provide particles in the range of from 30 micrometers to 80 micrometers. one of the advantages of the base powder produced by the method of this invention, is that it can be cold pressed in inexpensive dies and sintered in an air atmosphere at temperatures easily achieved with a commonly available silicon-carbide element furnace. Hot isostatic pressing is not necessary to get pellets of the base powder.

Referring again to FIG. 1, the interconnection film 26 is preferably made up of a layer of closely packed, discrete, doped $LaCrO_3$ particles. In one method of applying the interconnection particles, the air electrode 16 can be wetted with a suitable liquid such as water, after which the desired amount of doped $LaCrO_3$ particles can be dusted or otherwise applied over or pressed into the interconnection site. Of course, other methods of applying a very thin, closely packed layer of doped $LaCrO_3$ particles can be used, for example tape application.

Additional application of a solid electrolyte layer over the remaining portion of the air cathode surface, if the electrolyte is to be applied after the interconnection, applying a cermet fuel electrode over the electrolyte, and then a cermet coating over the interconnection layer, will complete formation of an electrochemical cell, such as a fuel cell. Each fuel cell is preferably tubular and is electrically connected at least in series to an adjacent fuel cell. The electrical connection is made along the axial length of the interconnect through a metal fiber felt not shown in FIG. 1. A typical cell generates an open circuit voltage of approximately one volt, and multiple cells can be connected in series and in parallel in order to provide a desired system voltage.

The invention will now be illustrated with reference to the following Example.

EXAMPLE

Sinterable lanthanum chromite powder was prepared in this Example.

Amorphous citrate liquids were prepared as separate liquids for various metal cation species using water-glycol solvent. One mole of citric acid was used for each equivalent of metal cation. The formulations are summarized in TABLE 1 below.

TABLE 1

Amorphous Citrate Liquid Formulations

| Cation | Cr | La | Sr |
|---|---|---|---|
| Starting ethylene glycol | 1056 g. | 1002 g. | 284 g. |
| Citric Acid Monohydrate | 496 g. | 455.96 g. | 87.9 g |
| Nitrate/Amount | $Cr(NO_3)_3.9H_2O$ 314 g. | $La(NO_3)_3.6H_2O$ 313.2 g. | $Sr(NO_3)_2$ 44.3 g. |
| Hold Temps. and Times | 90° C. until "boils" + 110° C. for 3 hrs. | 110° C. for 23 hrs. | 110° C. until "boil". Hold at 100° C. for 24 hrs. |
| End pH (before diluting) | 1.8 | 3.2 | 0.6 |
| Dilution for filtering | 800 ml distilled water | 900 ml distilled water | 100 ml ethylene glycol |
| End Nitrate (after dilution) | 160 ppm | 3.0% | 10.8% |
| g. oxide/ g. liquid | 0.03089 | 0.04850 | 0.0680 |

The ethylene glycol liquid was placed in an appropriately sized beaker (3 to 4 times the liquid volume), and the citric acid monohydrate was added as a powder. The mixture was heated at from 40° C. to 50° C. with stirring to dissolve the citric acid. The nitrate was added and the admixture heated to the temperatures for the times shown in TABLE 1, while stirring. A nitrate "boil" was observed, with brown $N_2O_4$ gas evolution. This was more noticeable with the chromium. A sample of each was removed and allowed to cool to room temperature, and the pH of each sample liquid was measured using a Fisher Accumet 900 pH meter. The liquids were diluted at 50° C. with water or ethylene glycol and then filtered through Watman 40 filter paper using a Buechner funnel.

The nitrate concentrations were measured after filtration using a Corning 476134 nitrate electrode and a Corning 476370 double junction reference electrode. Nitrate calibration standards were prepared from $NaNO_3$ in glycol or water-glycol solution, as appropriate. The oxide available from each liquid was measured by combustion. Liquid sample sizes were four grams for the lanthanum and strontium and eight grams for the chromium.

The samples were placed in tared porcelain crucibles. These samples were dried a minimum of 16 hours in air at 110° C., to cause a substantial evaporation of solvent. The lanthanum and chromium samples were combusted at 1,100° C. in air for four hours (minimum time), then the furnace was cooled to 400° C. At 400° C. the samples were placed in a desiccator until room temperature weighings were made. The chromium samples were heated slowly through the temperature range from 250° C. to 350° C. to avoid boiling the combusting resin out of the crucible. The strontium samples were combusted at 1,100° C. in air for four hours minimum, then cooled in flowing argon (passed over drierite) to prevent carbonate formation. Using the cation contents determined from the oxide weights on combustion, the liquids were mixed to obtain the appropriate stoichiometry for $La_{0.83}Sr_{0.16}CrO_3$.

After the liquids were mixed, they were held for 27 hours at 90° C. and 14.5 hours at 110° C. with stirring. This hold at elevated temperature drove off glycol and reduced the volume by 25%. The liquid was then heated in a rotoevaporator under a partial vacuum in 800 ml batches until finely divided suspended precipitates formed. The following schedule was used in the rotoevaporator: 45 minutes, 115° C., and 25.4 cm Hg; 45 minutes, 120° C., and 25.4 cm Hg; 1 hour, 130° C., and 25.4 cm Hg; 1.5 hours, 130° C., and 50.8 cm Hg; 1.5 hours, 135° C., and 50.8 cm Hg; and 12.0 hours, 140° C., and 50.8 cm Hg.

After the rotoevaporator treatment 2 g. of ashless paper pulp was added per 100 ml. liquid. A shaft driven stirrer was used to disperse the pulp. The liquid was then poured into teflon petri dishes at 0.635 cm depth and given the following treatment: 120° C., 35.5 to 43.18 cm Hg, overnight; 130° C., 58.4 to 60.9 cm Hg, for 24 hours; 140° C., maximum vacuum for 8 hours; and 150° C. maximum vacuum for 48 to 72 hours, to provide a foamed, porous, brittle mass of amorphous polymeric material in cake form.

The cakes were then broken by placing them in a polyethylene envelope and crushing them to less than 0.63 cm with a plastic mallet. These chunks were loaded into 65 mm × 150 mm alumina boats and charred at 280° C. for one hour to burn off organic components. The boats were loaded so the chunks practically formed a single layer. Air flow of about 80 liter per hour was used initially and reduced as required to prevent the boat temperature exceeding 310° C. This produced a hard charred material comprising La, Cr and Sr and residual uncharacterized organic.

After charring, the chunks were dry milled to less than 53 micrometers diameter using a dry vibratory mill on a Sweco mill two hours, with non-contaminating zirconia media having a weight three to five times the char weight. Polyethylene bottles were used as the container for milling. The ground char was dried at 110° C. overnight before screening. After everything has passed through the 53 micrometer screen, the charred ground powder was recombined and blended in a bottle by rolling on a jar mill. A two gram sample was combusted for weight loss then analyzed for cation content by X-ray fluorescence.

The char which had been ground to less than 53 micrometers diameter, was then calcined for 12 hours at 850° C., in 3 liters/minute flowing argon containing 10,000 ppm (1%) oxygen. The material was then recalcined for an additional 4.5 hours at 850° C. in 3 liters/minute flowing argon containing 10,000 ppm (1%) oxygen. Each calcining load consisted of two 40 mm × 95 mm alumina boats each containing about 25 g. of the starting char. The boat positions with respect to the gas inlet were reversed between runs. The specific surface area of the final material was 10.6 m$^2$/g. Another batch using 30,000 ppm (3%) oxygen in argon had a specific surface area of 8 m$^2$/g. The final material was LaCrO$_3$ containing from 5 weight % to 20 weight % of a chromite of Sr.

A sintering aid coating process was then initiated. The appropriate nitrate concentration was dissolved in a 1:1 n-prohpanol:distilled water solution to yield three weight percent SrCrO$_4$ upon heating. The powder resulting from the calcining described previously was dispersed in this slurry at about 16 weight percent. The composition of this slurry is shown in TABLE 2.

TABLE 2

| Slurry For Adding Sintering Aid | | |
|---|---|---|
| Component | Amount | Purpose |
| Basis powder (high specific S.A.) | 42 g. | High specific surface area powder from calcine to be coated. |
| Sr(NO$_3$)$_2$ + Cr(NO$_3$)$_3$.9H$_2$O | 1.91 g. 6.46 g | Will form SrCrO$_4$ on 450° C. calcining |
| 50/50 n-propanal/water | 200 ml | Solvent |
| Ethoxylated Oleic Acid | 2 ml | Dispersing Aid |

The slurry pH was 3.8 for two batches. For La$_{0.83}$Sr$_{0.16}$CrO$_3$ a zeta potential of about 30 mv is expected at this pH value, which is adequate to slow flocculation rate but not adequate to insure a stable suspension.

The particles in the slurry were then milled for 32 to 40 hours on a Sweco vibratory mill. The slurry was diluted as soon as it came from the mill and placed on a stirrer to prevent flocculation and settling. The dilution solution consisted of equal parts of n-propanol and water plus one percent of an ethoxylated oleic acid acting as a wetting or dispersing agent.

The diluted slurry was then spray-dried, to simultaneously evaporate solvent and coat the powder particles, using a Yamato GA32 spray-drier. The following operating parameters were used for the spray-drier: drying air inlet temperature: 140° C.; drying air outlet temperature: 72° C. to 74° C.; aspirator air flow: 0.55 m$^3$/minute; liquid pump rate: 0.75 to 1.0 (about 15 ml/min); and nozzle air pressure: 1.0 Kgf/cm$^2$. This provided particles of sinterable material coated with a solidified mixture of nitrates.

The coated powder was then calcined for 40 minutes at 450° C. to decompose the nitrates and form a SrCrO$_4$ coating which constituted 3 weight % of the total weight of the coated La$_{0.83}$Sr$_{0.16}$CrO$_3$ particles. The powder particles were LaCrO$_3$ containing from 5 weight % to 20 weight % of SrCrO$_3$. The powder had a specific surface area of from 8 m$^2$/g to 10.6 m$^2$/g.

The powder product of the process described to this point was dispersed in a solution for ethanol and methyl-ethyl-ketone by vibratory milling. Polymeric acrylic binder was added with additional milling to mix into the suspending solvent. Samples taken from this suspension were diluted and dried. The agglomerate sizes were measured using a Zeiss Quantimet. The median agglomerate size was 0.305 micrometer, with a maximum size of 1 micrometer. The suspension was cast on a temporary substrate at 0.0127 cm and 0.028 cm wet film thicknesses. The film was dried slowly in the presence of solvent vapor.

Discs of the dried film were sintered at 1,520° C. for ten hours. The green density was between 49% and 52% of theoretical density. Discs of the 0.0127 cm thick film were warm laminated to an unsintered air electrode material; i.e., La$_{0.8}$Ca$_{0.2}$MnO$_3$, at 140° C. then sintered at 1,520° C. for 10 hours. An SEM photomicrograph of the resulting material after peeling away from the lanthanum manganite showed near theoretical density and only low levels of manganese pick-up from interaction with the lanthanum manganite. The laminated sample appeared to be fully dense, and further reduction in sintering temperature below 1,520° C. and sintering time below 10 hours appears to be feasible.

We claim:

1. A method of making a highly sinterable lanthanum chromite powder containing a dopant metal, comprising the steps:

(1) separately dissolving a La source, a Cr source and a source of a dopant metal selected from the group consisting of Ca, Sr, Co, Ba, Mg, and mixtures thereof, in a mixture of an acid selected from the group consisting of polycarboxylic acids, hydroxy acids and mixtures thereof, and a polyhydroxy alcohol, to form a solution of each;

(2) evaporating a substantial amount of each of the solutions formed in step (1), and any precipate formed is filtered out of the solutions;

(3) mixing the solutions together in the desired proportions to achieve a desired ratio of La, Cr and dopant metal, heating the solution mixture to reduce alcohol content and then further heating under a vacuum condition until esterification and polymerization occur, to form submicron polymer precipitates;

(4) continuing heating the solution mixture under a vacuum condition until a foamed, porous mass of amorphous organic polymeric material forms;

(5) heating the foamed amorphous polymeric material to burn off organic components and produce a hard, somewhat porous, charred material comprising La, Cr, and dopant metal;

(6) grinding the somewhat porous charred material to a powder;

(7) heating the somewhat porous, charred, ground powder at from 590° C. to 950° C., in a flowing atmosphere of inert gas containing from 100 ppm to 50,000 ppm O$_2$ and less than 300 ppm CO$_2$, for a time effective to provide a sinterable material having a high specific surface area of from 7 m²/g to 30 m²/g, consisting essentially of LaCrO₃, containing from 5 weight % to 20 weight % of a chromite of the dopant metal;

(8) adding the high specific surface area sinterable material solids to an aqueous solution mixture of a nitrate of Cr and a nitrate of a dopant metal selected from the group consisting of Ca, Sr, Co, Ba, Mg, and mixtures thereof, to form a slurry, where the total nitrate is added in an amount effective to provide from 3 weight % to 20 weight % dopant metal chromate upon subsequent evaporation and heating in step (11);

(9) grinding the particles in the slurry to provide particles of a sinterable material having a diameter up to 3 micrometers in the slurry;

(10) taking the nitrate slurry with the ground particles and simultaneously evaporating solvent and coating the particles of sinterable material with a solidified mixture of nitrates, to provide dry, coated particles; and

(11) heating the dry, coated particles at a temperature effective to convert the nitrate coating to a chromate coating, where the chromate coating constitutes from 3 weight % to 20 weight % of the total weight of the coated particles, to provide a highly sinterable powder having a high specific surface area of from 7 m²/g to 30 m²/g.

2. The method of claim 1, where after step (3), 1 weight % to 10 weight % of combustible organic particles are added to the solution mixture, as a fugitive pore forming additive, the organic particles having diameters or lengths up to approximately 1 micrometer, and where the polymeric material formed in step (4), the charred material formed in step (5) and the ground powder used in step (6) is somewhat porous and contains a series of internal voids and interconnecting passages.

3. The method of claim 1, where the dopant metal is Sr, and the source of a dopant metal is a nitrate.

4. The method of claim 1, where, after step (2), the solutions are diluted with a liquid selected from the group consisting of H₂O, polyhydroxy alcohol, and mixtures thereof, and any precipitate formed is filtered off, the heating in step (5) is from 250° C. to 325° C., and the powder formed in step (6) has a particle size of from 10 micrometers to 200 micrometers diameter.

5. The method of claim 1, where, in step (7), heating will be from 650° C. to 850° C., to provide a sinterable material having a high specific surface area.

6. The method of claim 1, where after step (8), the pH of the slurry is adjusted to between 3.5 and 5.5 if it is not already in that range.

7. The method of claim 1, where, in step (10) the simultaneous evaporation and coating is accomplished by a spray drying technique.

8. The method of claim 1, where, in step (10) the simultaneous evaporation and coating is accomplished by a freeze drying technique.

9. The method of claim 1, where, in steps (2) and (3), from 20 weight % to 60 weight % of the solution is evaporated, first by heating at from 100° C. to 120° C. to evaporate up to 20 weight %, and then heating is continued in a rotating evaporation until esterification and polymerization proceeds to a color change point and microscopic precipitates begin to form.

10. The method of claim 1, where, in step (8) the dopant metal is Sr and the coating formed in step (11) is from 3 weight % to 8 weight % of the total weight of the coated particles.

11. The method of claim 1, where the coating formed in step (11) is SrCrO₄.

12. The method of claim 1, where the highly sinterable material of claim 11 has an approximate chemical composition of La₀.₈₃Sr₀.₁₆CrO₃ coated with from 3 weight % to 8 weight % SrCrO₄, said material having a high specific surface area of from 7 m²/g to 30 m²/g and a particle size of from 0.01 micrometer to 2 micrometers.

13. The method of claim 1, where, after step (11) the coated particles are pressed into pellets, the pellets are sintered, the sintered pellets are crushed, and the crushed pellets are sieved to provide particles having diameters in the range of from 30 micrometers to 80 micrometers.

* * * * *